(12) United States Patent
Chandrasekaran et al.

(10) Patent No.: US 9,467,459 B2
(45) Date of Patent: Oct. 11, 2016

(54) SYSTEM AND METHOD FOR DETECTION OF ROGUE ROUTERS IN A COMPUTING NETWORK

(71) Applicant: Aruba Networks, Inc., Sunnyvale, CA (US)

(72) Inventors: Sridhar Chandrasekaran, Bangalore (IN); Ramprasad Vempati, Bangalore (IN); Divakar Dharanalakota, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 25 days.

(21) Appl. No.: 13/836,156

(22) Filed: Mar. 15, 2013

(65) Prior Publication Data

US 2014/0283029 A1    Sep. 18, 2014

(51) Int. Cl.
*H04L 29/06* (2006.01)

(52) U.S. Cl.
CPC ..................... *H04L 63/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,873,993 B2* | 1/2011 | King | ................... | H04L 63/0263 726/1 |
| 8,549,634 B2* | 10/2013 | Dubey | .................... | H04L 63/14 726/22 |
| 8,964,741 B2* | 2/2015 | Retana | .................... | H04L 45/02 370/390 |
| 9,015,852 B2* | 4/2015 | Thubert | ............. | H04L 63/1458 726/26 |
| 2007/0286143 A1* | 12/2007 | Olson et al. | .................. | 370/338 |
| 2011/0191827 A1* | 8/2011 | Balay | .................... | G06F 17/30 726/4 |

* cited by examiner

*Primary Examiner* — Beemnet Dada
(74) *Attorney, Agent, or Firm* — Brooks, Cameron & Huebsch, PLLC

(57) ABSTRACT

A method and apparatus for detecting the presence of a rogue router in a computer network is described. The method may include transmitting a router solicitation message. The method may also include receiving a plurality of response messages to the router solicitation message from a first plurality of router devices, wherein the response messages are used to perform an operation other than assigning an internet protocol (IP) address to the device.

27 Claims, 4 Drawing Sheets

SYSTEM AND METHOD FOR DETECTION OF ROGUE ROUTERS IN A COMPUTING NETWORK

TECHNICAL FIELD

Embodiments of the invention relate to the field of communication, and more particularly, to the detection of rogue routers in a computing network.

BACKGROUND

Digital networks are becoming ubiquitous in enterprises, providing secure and cost-effective access to resources. Those networks usually have one or more controllers, each controller supporting a plurality of routers, network switches, wireless access points (AP), etc. deployed through the enterprise. A WiFi networks operating in accordance with IEEE 802.11 standards is an example of such a network.

There are risks and vulnerabilities associated with digital networks. A rogue router is a computing device connected to a digital network that is not explicitly authorized to connect with the digital network. Such unauthorized devices may lead to the misconfiguration of client devices seeking to join the network, introduction of malicious software (i.e., computer viruses) onto network devices, and potential interruption of service on the digital network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Figure 1:
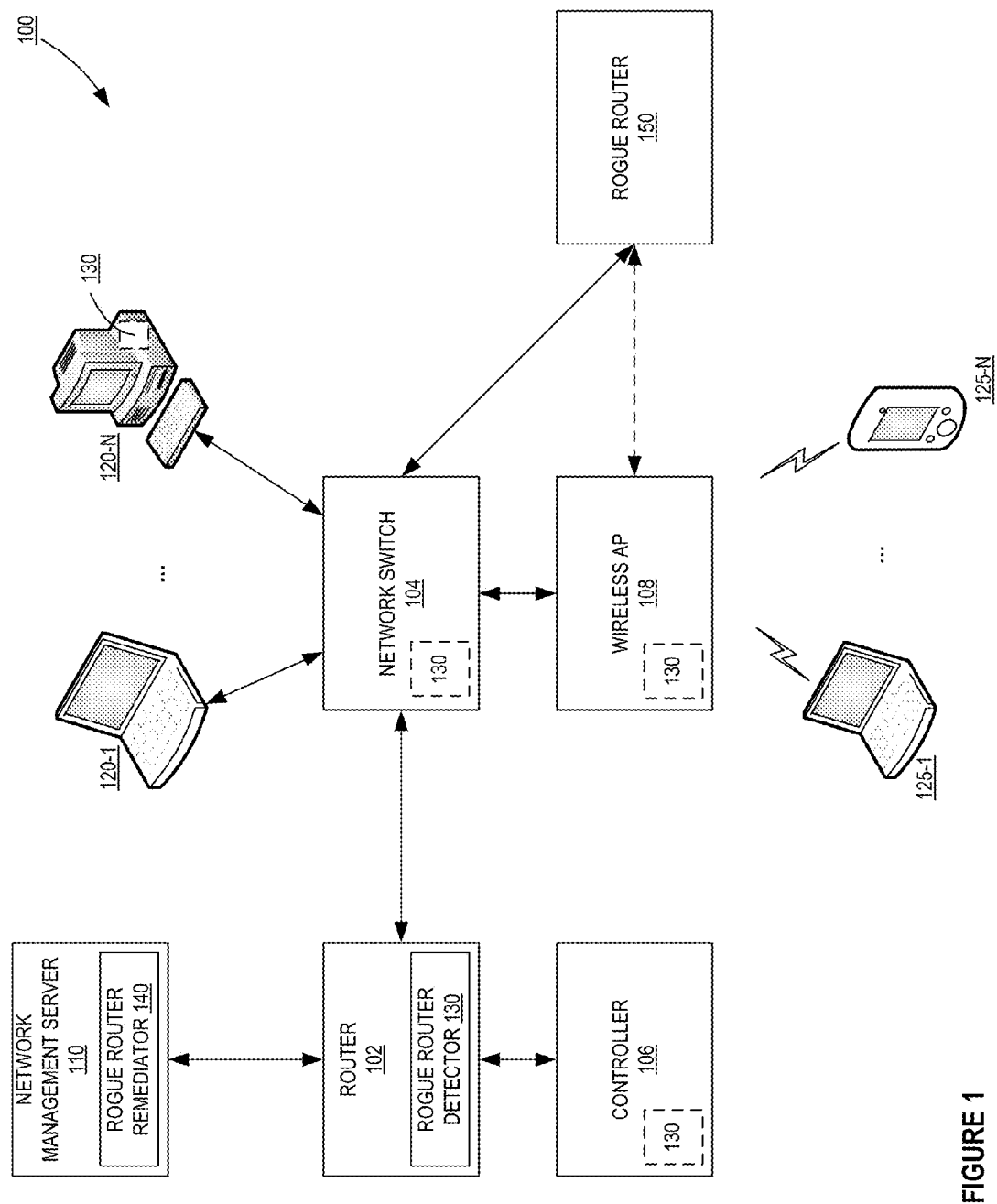
FIG. 1 is a block diagram of exemplary system architecture for detection of rogue routers in a computing network.

FIG. 1 is a block diagram of exemplary system architecture for detection of rogue routers in a computing network 100. System architecture illustrates a network 100 that includes a plurality of network devices, such as controller 106, router 102, network switch 104, wireless access point (AP) 108, and network management server 110. Although only a single controller, router, network switch, wireless AP, and network management server are illustrated, the network 100 illustrated by system architecture may include one or more of each of the different network devices consistent with the discussion herein. In one embodiment, the controller 106 supports devices such as router 102, network switch 104, wireless AP 108 to enable communication channels within the network 100 that allow sharing of resources and information. In one embodiment, controller 106 provides networking across wireless and wired network connection, VPN connections, and remote services, and integrates a networking and security functions into the network infrastructure and user experience.

The network 100, as referred to and discussed herein, may run on one Local Area Network (LAN) and may be incorporated into the same physical or logical system, or different physical or logical systems. Alternatively, network 100 may reside on different LANs, wide area networks, etc. that may be coupled together via the Internet but separated by firewalls, routers, and/or other network devices. It should be noted that various other network configurations can be used including, for example, hosted configurations, distributed configurations, centralized configurations, etc.

The system architecture further includes one or more client computing devices 120-1 through 120-N coupled to the network 100 via network switch 104, and one or more client computing devices 125-1 through 125-N coupled to the network 100 via wireless AP 108. Client computing devices 120 connect to the network switch 104, and client computing devices 125 connect to the wireless AP 108, to access services such as the Internet through controller 106.

The system architecture further includes one or more network management servers, such as network management server 110, coupled to the network 100. In one embodiment, network management server 110 executes network management applications. For example, network management server 110 may provide manual or automated network management services to manage various aspects affecting the network, such as managing the radio frequency environment, controllers, wired infrastructure, and access points. Network management server 110 may further provide a user interface to network administrators to provide charts, tables, diagnostic information and alerts.

In one embodiment, controller 106, router 102, network switch 104, wireless AP 108, and network management server 110 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, controllers, switches, and wireless APs operate under control of a LINUX® operating system, with purpose-built programs providing controller and access point functionality.

Client computing devices 120 and 125 also contain a processor, memory hierarchy, and a number of interfaces including a wired and/or wireless interfaces for communicating with network switch 104 or wireless AP 108. Typical client computing devices include personal computers, handheld and tablet computers, Wi-Fi phones, wireless barcode scanners, and the like.

In one embodiment, the network 100 illustrated in FIG. 1 utilizes the internet protocol version 6 (IPv6) communications protocol to route data traffic across the network and between the different network devices (e.g., router 102, network switch 104, wireless AP 108, client computing devices 125 and 120, network management server 110). In IPv6, each device on the network illustrated in FIG. 1, such as router 102, network management server 110, client computing systems 120 and 125, etc. is assigned a 128-bit internet protocol (IP) address for identification and location addressing in order to communicate with other devices.

Typically, when a client computing device, such as client computing device 120 or 125, joins the network, the client computing device will send a router solicitation message to discover the presence of routers on the network, and to obtain information that will enable the client computing device to perform autoconfiguration, such as generating/completing an IP address of the device. The router solicitation message may contain the computing device's media access control (MAC) address and other addressing data. Then routers, such as router 102, respond with a router advertisement message that contain information needed by the client computing devices, such as link prefixes, the router's MAC address, routing data for the network, etc. By exchanging the router solicitation and router advertisement message, the client computing device may join the network, configure its IP address from the received data, and further configure its network connection.

In one embodiment, the network 100 may also include a rogue router 150. As discussed herein, a rogue router is a wired or wireless network device or client computing device connected to the network 100 that is not explicitly authorized to connect with the network 100. Because rogue router 150 is connected to the network without authorization, a significant security risk is created. For example, rogue router 150 need not comply with network security requirements, and as a result, could allow any virus-infected or otherwise malicious machine to join the network 100. Furthermore, rogue router 150 could spoof a legitimate router computing device connected to the network 100. Finally, rogue router 150 can cause interruption in connectivity to other computing devices on the network by spreading incorrect configuration data.

In one embodiment, rogue router 150 also responds to the router solicitation message with a router advertisement message. However, the rogue router's 150 advertisement message will generally include the client computing system's MAC address and allegedly legitimate networking data, such as link prefixes, routing data, etc. As a result, the client computing device, such as client computing device 120-N, could connect with the rogue router 150 and not to a legitimate network router 102, leading to misconfiguration of client computing device 120-N, insecure data transmission, etc.

In one embodiment, in order to detect the presence of a rogue router, such as rogue router 150, one or more rogue router detectors 130 are deployed. Although illustrated and discussed with respect to router 102, rogue router detectors 130 may be deployed in any of the network devices consistent with the discussion herein. In one embodiment, rogue router detector 130 generates and transmits a router solicitation message on the network. In IPv6 networks, routers and other network devices do not typically transmit router solicitation messages. Rather, it is the role of client computing devices attempting to join and configure network access to generate and transmit the router solicitation messages. Thus, in one embodiment, the router solicitation message generated by the rogue router detector 130 attempts to detect the present of rogue router 150 on the network, and enable rogue router remediator 140 of network management server 110 to take or more corrective actions.

In one embodiment, the router solicitation message generated and transmitted by rogue router detector 130 of router 102 is a typical router solicitation message that includes the router's 102 MAC address and other typical router solicitation addressing information. Rogue router detector 130 will then listen to the router advertisement response messages received from the network devices, such as other routers (not illustrated) on the network. In one embodiment, rogue router detector compares the received MAC addresses, link prefixes, and other addressing information with known network device MAC, link prefix information, and IPv6 addressing data stored at rogue router detector 130 or alternatively stored at rogue router remediator 140, to determine if any of the received rogue router advertisement messages include suspicious data. In one embodiment, data within a router advertisement message may be deemed suspicious, and originating from a rogue router, when the MAC address matches router's 102 MAC address, when IPv6 addressing information indicates the message originated from a non-provisioned hardware or software port, etc. Furthermore, in one embodiment, the data with the router advertisement message may further be deemed suspicious, and originating from a rogue router, when one or more of source link layer, destination link layer, prefix information, a redirected header, a maximum transmission unit field, or a user define field within the router advertisement message do not match information with stored for known network devices.

In one embodiment, upon detection of rogue router 150 from the suspicious router advertisement message, rogue router detector 130 forwards the identification, including any of the data determined to be suspicious from the comparison, to rogue router remediator 140. In one embodiment, rogue router remediator 140 utilizes the data to generate one or more alert messages, such as one or more simple network management protocol (SNMP) alerts or one or more Syslog messages transmitted to network management server 110, for a network administrator that a rogue router is present in the network 100, that the rogue router is spoofing a legitimate router when the router advertisement message re-used the MAC address of the device originating the router solicitation message, shut down a physical port on network switch 104 that rogue router 150 is using to access network 100, shut down a software port, etc.

Therefore, rogue router detector 130, which may be employed in any network device as well as a client computing device, enables the detection of rogue routers in an IPv6 computing network. In one embodiment, the detection is accomplished by generating and transmitting a router advertisement message at a network device, even though router advertisement messages are typically only generated by client computing devices seeking to join a network or configure a network connection. Furthermore, various data in the router advertisement replay of a rogue router may be used to both identify the rogue router, and perform one or more corrective actions against the rogue router. The detection and remediation of rogue routers on a network ensures that client computing devices are not misconfigured, and ensures that network traffic is not disrupted or intercepted for malicious purposes.

Figure 2:
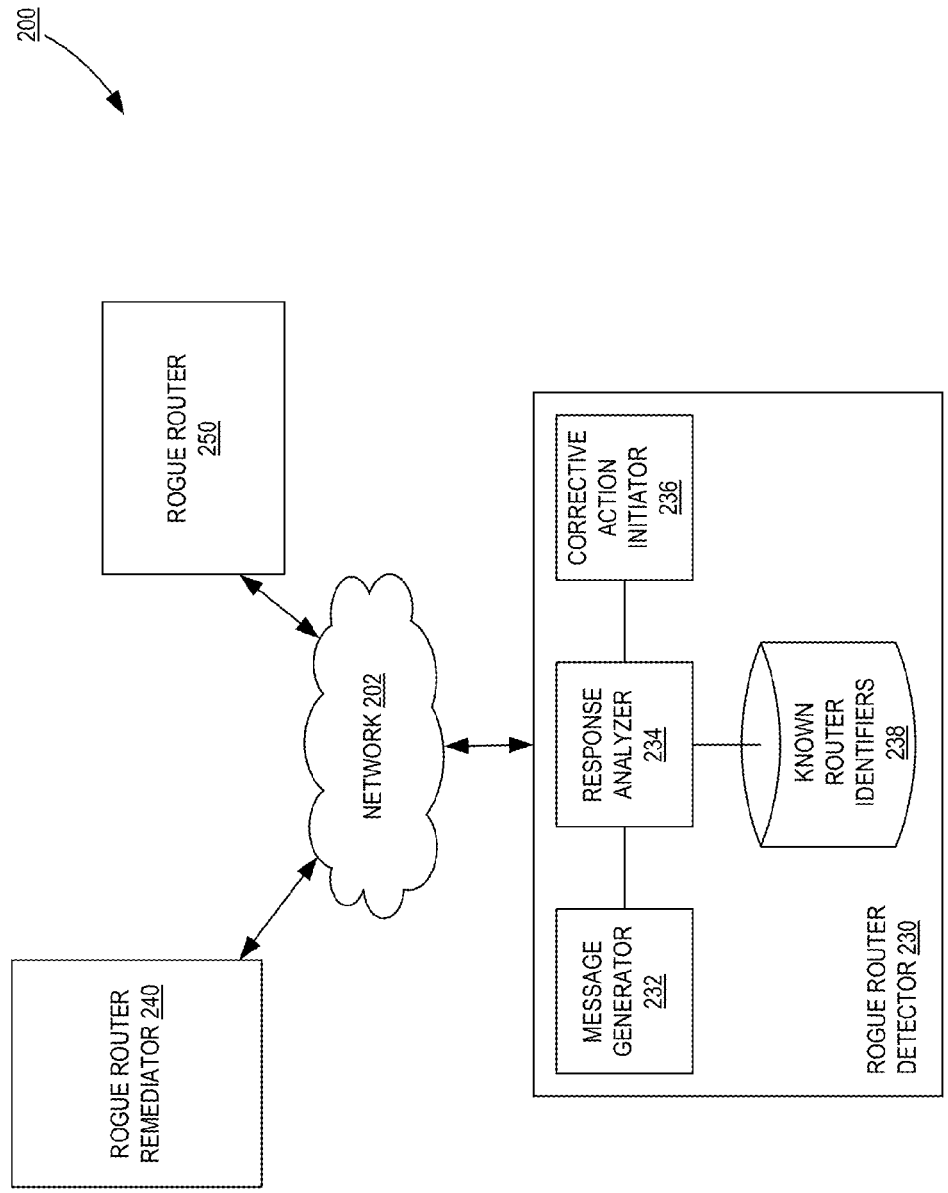
FIG. 2 is a block diagram of one embodiment of a rogue router detector.

FIG. 2 is a block diagram of one embodiment 200 of a rogue router detector. Rogue router detector 230, as illustrated in FIG. 2, provides additional details for the rogue router detector 130 discussed above in FIG. 1. In one embodiment, rogue router detector 230 includes a message generator 232, a response analyzer 234, a corrective action initiator 236, and a known router identifiers database 238.

In one embodiment, rogue router detector 230 is deployed in a computing device, such as a network device or client computing device as discussed above. Furthermore, computing device may be connected with or part of a computing network 202. In one embodiment, the computing network 202 utilizes IPv6 for communicating data across the network and between different interconnected devices on the network.

In one embodiment, message generator 232 is responsible for generating a router solicitation message. As discussed above, router solicitation messages are typically only generated by client devices seeking to join a network or configure a connection to the network. However, message generator 232 generates the router solicitation message in order to detect the present of rogue router 250 on network 202. In one embodiment, message generator 232 generates a router solicitation message that includes a device MAC address, and other network addressing data typically found in a router advertisement message.

In one embodiment, response analyzer 234 is then responsible for listening to the router advertisement messages generated by various network devices in response to the router solicitation message. In one embodiment, response analyzer 234 analyzes each router advertisement message to determine if the message is suspicious for one or more reasons. The reasons that the message may be suspicious may include repetition of the MAC address used in the router solicitation message, use of a hardware port that has not been knowingly provisioned, etc. In one embodiment, a known router identifiers database 238 is maintained by rogue router detector 230 to aid response analyzer 234. In one embodiment, the known router identifiers database 238 stores data, such as known router MAC addresses, ports where the routers are provisioned, as well as other addressing data. Response analyzer 234 is then able to compare the addressing data in received router advertisement messages against the data in known router identifiers database 238. When a router advertisement message includes data not stored, or not matched, in known router identifiers database 238, response analyzer 234 informs corrective action initiator 236 as to the presence of rogue router 250 on network 202.

In one embodiment, corrective action initiator 236 is responsible for receiving an indication from response analyzer 234 that a suspicious router advertisement message has been received, as well as the MAC address, prefix data, and any other addressing information in the suspicious router advertisement message. In one embodiment, corrective action initiator 236 utilizes the data to start one or more corrective actions. In one embodiment, corrective action initiator 236 may trigger the turning off of a hardware port that rogue router 250 is using to connect to network 250. Corrective action initiator 236 may also generate one or more alerts that are transmitted to rogue router remediator 240. As discussed above, rogue router remediator 240 may provide an interface to a network administrator to view the alert messages, analyze the addressing data for the detected rogue router 250, view any corrective actions that have been performed, view any corrective actions that must still be taken (i.e., an indication to a network administrator to verify network devices), etc.

Figure 3:
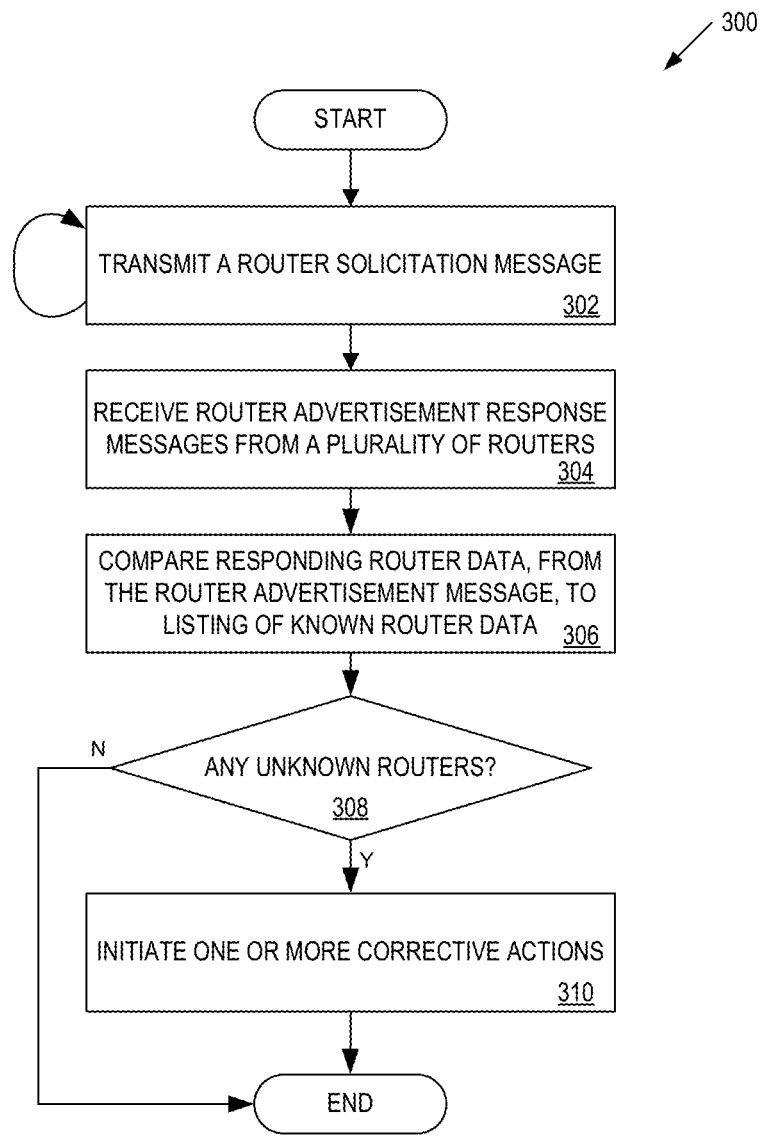
FIG. 3 is a flow diagram of one embodiment of a method for detection of a rogue router in a computing network.

FIG. 3 is a flow diagram of one embodiment of a method 300 for detecting a rogue router in a computing network. The method 300 is performed by processing logic that may comprise hardware (circuitry, dedicated logic, etc.), software (such as is run on a general purpose computer system, networking device, or other dedicated machine), firmware, or a combination. In one embodiment, the method 300 is performed by rogue router detector 130 or rogue router detector 230.

Referring to FIG. 3, processing logic begins by generating and transmitting a router solicitation message (processing block 302). As discussed herein, the router solicitation message is a message that includes a source MAC address, a destination address field, source address field, hop limit, etc. to enable discovery of the presence of routers on a network, and to obtain information that will enable client autoconfigure its IP address and network connection. Processing logic generates and transmits the router solicitation message, even though such messages are usually only generated by client devices seeking to join a network or configure a network connection. Furthermore, the generation and transmission of router solicitation messages may be performed by processing logic on a periodic basis, such as every minute, five minutes, etc. to periodically check for the presence of new rogue routers on a network in accordance with the discussion below.

Processing logic receives router advertisement response messages from a plurality of routers (processing block 304). In one embodiment, the router advertisement messages may include the MAC address of the sending device, address of the sending device, network prefix data, etc. Processing logic utilizes the data in the router advertisement response messages to compare responding router data to known router data (processing block 306), and determines if there are any unknown/rogue routers on the network (processing block 308). In one embodiment, processing logic compares the MAC addresses in received router advertisement messages to determine if the same MAC address in the solicitation message is used in the advertisement message, which indicates a potential spoofing attack by a rogue router. Processing logic further compares the prefix data and the addressing data from a known router identifiers database to determine if any unknown data is used in a router advertisement message, which also indicates the presence of a rogue router.

When processing logic does not identify any unknown, or rogue routers, the process ends as no corrective actions are needed. However, when an unknown router is detected, for any of the reasons discussed herein, one or more corrective actions are initiated (processing block 310). The corrective actions may include one or more of notifying a network administrator and/or network management server that a rogue router has been detected on a network, notifying the network administrator as to a possible type of threat (e.g., spoofing attack), and shutting down one or more hardware or software ports where a rogue router was detected.

Figure 4:
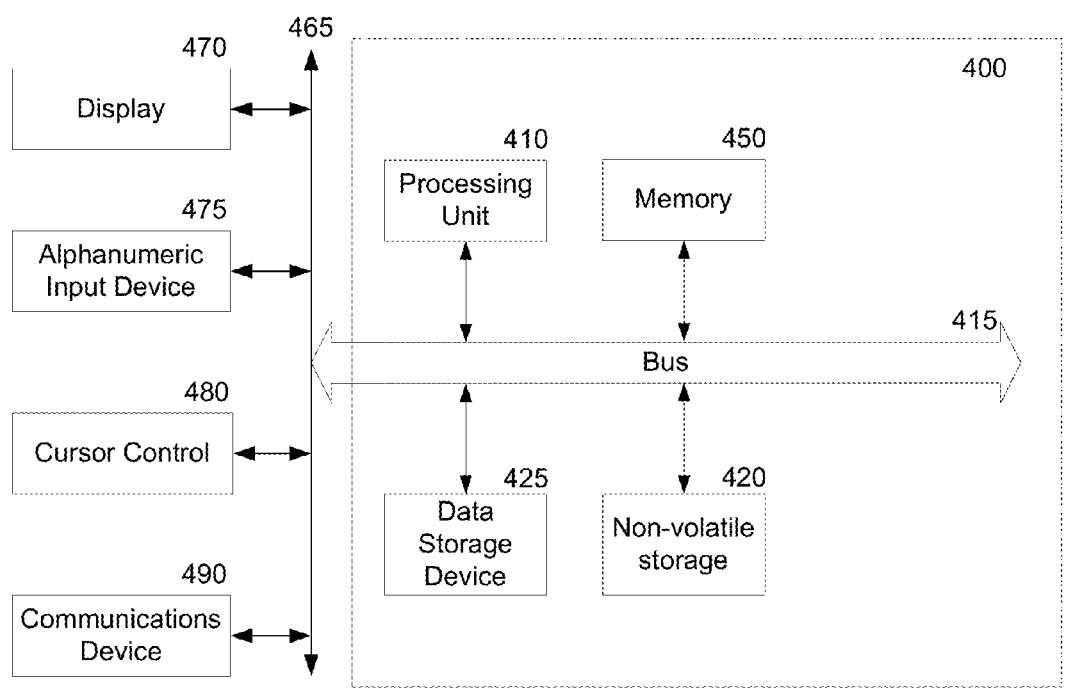
FIG. 4 illustrates a diagrammatic representation of a machine in the exemplary form of a computer system.

FIG. 4 is one embodiment of a computer system that may be used with the present invention. It will be apparent to those of ordinary skill in the art, however that other alternative systems of various system architectures may also be used.

The computer system illustrated in FIG. 4 includes a bus or other internal communication means 415 for communicating information, and a processor 410 coupled to the bus 415 for processing information. The system further comprises a random access memory (RAM) or other volatile storage device 450 (referred to as memory), coupled to bus 415 for storing information and instructions to be executed by processor 410. Main memory 450 also may be used for storing temporary variables or other intermediate information during execution of instructions by processor 410. The system also comprises a read only memory (ROM) and/or static storage device 420 coupled to bus 415 for storing static information and instructions for processor 410, and a data storage device 425 such as a magnetic disk or optical disk and its corresponding disk drive. Data storage device 425 is coupled to bus 415 for storing information and instructions.

The system may further be coupled to a display device 470, such as a cathode ray tube (CRT) or a liquid crystal display (LCD) coupled to bus 415 through bus 465 for displaying information to a computer user. An alphanumeric input device 475, including alphanumeric and other keys, may also be coupled to bus 415 through bus 465 for communicating information and command selections to processor 410. An additional user input device is cursor control device 480, such as a mouse, a trackball, stylus, or cursor direction keys coupled to bus 415 through bus 465 for communicating direction information and command selections to processor 410, and for controlling cursor movement on display device 470.

Another device, which may optionally be coupled to computer system 400, is a communication device 490 for accessing other nodes of a distributed system via a network. The communication device 490 may include any of a number of commercially available networking peripheral devices such as those used for coupling to an Ethernet, token ring, Internet, or wide area network. The communication device 490 may further be a null-modem connection, or any other mechanism that provides connectivity between the computer system 400 and the outside world. Note that any or all of the components of this system illustrated in FIG. 4 and associated hardware may be used in various embodiments of the present invention.

It will be appreciated by those of ordinary skill in the art that any configuration of the system may be used for various purposes according to the particular implementation. The control logic or software implementing the present invention can be stored in main memory 450, mass storage device 425, or other storage medium locally or remotely accessible to processor 410.

It will be apparent to those of ordinary skill in the art that the system, method, and process described herein can be implemented as software stored in main memory 450 or read only memory 420 and executed by processor 410. This control logic or software may also be resident on an article of manufacture comprising a computer readable medium having computer readable program code embodied therein and being readable by the mass storage device 425 and for causing the processor 410 to operate in accordance with the methods and teachings herein.

The present invention may also be embodied in a special purpose appliance including a subset of the computer hardware components described above. For example, the appliance may include a processor 410, a data storage device 425, a bus 415, and memory 450, and only rudimentary communications mechanisms, such as a small touch-screen that permits the user to communicate in a basic manner with the device. In general, the more special-purpose the device is, the fewer of the elements need be present for the device to function.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "comparing", "identifying", "determining", "alerting", "disabling", or the like, refer to the actions and processes of a computer system, or similar electronic computing devices, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for detecting a rogue router by a network device operating in a network comprising:

transmitting, by a rogue router detector, a router solicitation message, wherein the router solicitation message contains information that enables a client device to perform an autoconfiguration;

receiving by the rogue router detector a plurality of response messages to the router solicitation message from a first plurality of router devices;

analyzing the plurality of response messages to the router solicitation messages, wherein analyzing includes determining whether any of the plurality of response messages is indicative of a rogue router; and in response to a determination that a response message indicates a rogue router, forwarding information identifying the rogue router to a rogue router remediator on a network management server, wherein the rogue router detector is on a device other than a client computing device.

2. The method of claim 1, wherein determining whether any of the plurality of response messages is indicative of the rogue router comprises:

comparing one or more of source link layer, destination link layer, prefix information, a redirected header, a maximum transmission unit field, or a user define field included in any of the plurality of response messages with information stored for a plurality of known router devices; and based on the comparison, identifying at least one router device, from the first plurality of router devices, that is (a) operating on a network and (b) not included in the plurality of known router devices, wherein the at least one router device is being identified as the rogue router.

3. The method of claim 1, wherein determining whether any of the plurality of response messages is indicative of the rogue router comprises:

determining whether an IPv6 addressing information included in any of the plurality of response messages indicates any of the plurality of response messages originated from a non-provisioned hardware or software port, or determining whether a media access control (MAC) address included in any of the plurality of response messages matches a MAC address associated with the network device; and identifying at least one router device, from the first plurality of router devices, as the rogue router when (i) the IPv6 addressing information included in the response message received from the at least one router device originated from a non-provisioned hardware or software port, or (ii) when the MAC address included in the response message received from the at least one router device matches a MAC address associated with the network device.

4. The method of claim 2, wherein an alert message generated for the network management system declares a spoofing attack by the rogue router when the media access control (MAC) address in a response message generated by the rogue router matches a MAC address in the request message.

5. The method of claim 2, further comprising:

in response to identifying the at least one router device as the rogue router, disabling a port at which communication from the rogue router is being received.

6. method of claim 1, wherein the router solicitation message is an internet protocol version 6 (IPv6) router solicitation message transmitted by the device, and the plurality of response messages are IPv6 router advertisement messages.

7. The method of claim 6, wherein the IPv6 router solicitation message is transmitted by the device to discover the presence of IPv6 routers on a network and discover one or more network prefixes associated with each of the IPV6 routers that can be used by the device for routing data on the network via a corresponding IPv6 router.

8. The method of claim 6, wherein the IPv6 router advertisement messages contains data for use by the device to determine the network prefixes.

9. The method of claim 1, wherein new router solicitation are periodically transmitted by the device.

10. A system for detecting a rogue router comprising:

a network management server to execute network management applications;

at least one network device, wherein the at least one network device is a device other than a client computing device, the at least one network device being configured to perform operations comprising:

transmitting, by a rogue router detector, a router solicitation message wherein the router solicitation message contains information that enables a client device to perform an autoconfiguration, and receiving, by the rogue router detector, plurality of response messages to the router solicitation message from a first plurality of router devices, analyzing the plurality of response messages to the router solicitation messages, wherein analyzing includes determining whether any of the plurality of response messages is indicative of a rogue router, and in response to a determination that a response message indicates a rogue router, forwarding information identifying the rogue router to a rogue router remediator on the network management server.

11. The system of claim 10, wherein the at least one network device being configured to determine whether any of the plurality of response messages is indicative of the rogue router further comprises:

comparing one or more of source link layer, destination link layer, prefix information, a redirected header, a maximum transmission unit field, or a user define field included in any of the plurality of response messages with information stored for a plurality of known router devices, and based on the comparison, identifying at least one router device, from the first plurality of router devices, that is (a) operating on a network and (b) not included in the plurality of known router devices, wherein the at least one router device is being identified as the rogue router.

12. The system of claim 11, wherein the at least one network device being configured to determine whether any of the plurality of response messages is indicative of the rogue router further comprises:

determining whether an IPv6 addressing information included in any of the plurality of response messages indicates any of the plurality of response messages originated from a non-provisioned hardware or software port, or determining whether a media access control (MAC) address included in any of the plurality of response messages matches a MAC address associated with the network device; and identifying at least one router device, from the first plurality of router devices, as the rogue router when (i) the IPv6 addressing information included in the response message received from the at least one router device originated from a non-provisioned hardware or software port, or (ii) when the MAC address included in the response message received from the at least one router device matches a MAC address associated with the network device.

13. The system of claim 11, wherein an alert message generated for the network management system declares a spoofing attack by the rogue router when the media access control (MAC) address in a response message generated by the rogue router matches a MAC address in the request message.

14. The system of claim 11, wherein the at least one network device being configured to perform operations further comprises:
in response to identifying the at least one router device as the rogue router, disabling a port at which communication from the rogue router is being received.

15. The system of claim 10, wherein the router solicitation message is an internet protocol version 6 (IPv6) router solicitation message transmitted by the device, and the plurality of response messages are IPv6 router advertisement messages.

16. The system of claim 15, wherein the IPv6 router solicitation message is transmitted by the device to discover the presence of IPv6 routers on a network and discover one or more network prefixes associated with each of the IPV6 routers that can be used by the device for routing data on the network via a corresponding IPv6 router.

17. The system of claim 15, wherein the IPv6 router advertisement messages contains data for use by the device to determine the network prefixes.

18. The system of claim 10, wherein new router solicitation are periodically transmitted by the device.

19. An article of manufacture having one or more non-transitory computer readable storage media storing executable instructions thereon which when executed cause a network device operating in a network to perform a method for detecting a rogue router comprising:
transmitting by a rogue router detector a router solicitation message wherein the router solicitation message contains information that enables a client device to perform an autoconfiguration;
receiving by the rogue router detector a plurality of response messages to the router solicitation message from a first plurality of router devices;
analyzing the plurality of response messages to the router solicitation messages, wherein analyzing includes determining whether any of the plurality of response messages is indicative of a rogue router; and
in response to a determination that a response message indicates a rogue router, forwarding information identifying the rogue router to a rogue router remediator on a network management server
wherein the rogue router detector is on a device other than a client computing device.

20. The article of manufacture of claim 19, wherein determining whether any of the plurality of response messages is indicative of the rogue router comprises:
comparing one or more of source link layer, destination link layer, prefix information, a redirected header, a maximum transmission unit field, or a user define field included in any of the plurality of response messages with information stored for a plurality of known router devices; and
based on the comparison, identifying at least one router device, from the first plurality of router devices, that is (a) operating on a network and (b) not included in the plurality of known router devices, wherein the at least one router device is being identified as the rogue router.

21. The article of manufacture of claim 19, wherein determining whether any of the plurality of response messages is indicative of the rogue router comprises:
determining whether an IPv6 addressing information included in any of the plurality of response messages indicates any of the plurality of response messages originated from a non-provisioned hardware or software port, or determining whether a media access control (MAC) address included in any of the plurality of response messages matches a MAC address associated with the network device; and
identifying at least one router device, from the first plurality of router devices, as the rogue router when (i) the IPv6 addressing information included in the response message received from the at least one router device originated from a non-provisioned hardware or software port, or (ii) when the MAC address included in the response message received from the at least one router device matches a MAC address associated with the network device.

22. The article of manufacture of claim 20, wherein an alert message generated for the network management system declares a spoofing attack by the rogue router when the media access control (MAC) address in a response message generated by the rogue router matches a MAC address in the request message.

23. The article of manufacture of claim 20, further comprising:
in response to identifying the at least one router device as the rogue router, disabling a port at which communication from the rogue router is being received.

24. The article of manufacture of claim 19, wherein the router solicitation message is an internet protocol version 6 (IPv6) router solicitation message transmitted by the device, and the plurality of response messages are IPv6 router advertisement messages.

25. The article of manufacture of claim 24, wherein the IPv6 router solicitation message is transmitted by the device to discover the presence of IPv6 routers on a network and discover one or more network prefixes associated with each of the IPV6 routers that can be used by the device for routing data on the network via a corresponding IPv6 router.

26. The article of manufacture of claim 24, wherein the IPv6 router advertisement messages contains data for use by the device to determine the network prefixes.

27. The article of manufacture of claim 19, wherein new router solicitation are periodically transmitted by the device.

\* \* \* \* \*